United States Patent [19]

Marschewski

[11] Patent Number: 4,638,753
[45] Date of Patent: Jan. 27, 1987

[54] RING SEGMENT SHIP HULL

[76] Inventor: Henry Marschewski, Dürerweg 11b, D - 2190 Cuxhaven 13, Fed. Rep. of Germany

[21] Appl. No.: 689,673

[22] Filed: Jan. 8, 1985

[30] Foreign Application Priority Data

Jan. 20, 1984 [DE] Fed. Rep. of Germany ....... 3401908

[51] Int. Cl.$^4$ ................................................ B63B 1/00
[52] U.S. Cl. .................................................... 114/56
[58] Field of Search ................................... 114/56–57, 114/59, 65 R, 349, 355, 358, 359, 347

[56] References Cited

U.S. PATENT DOCUMENTS 1,368,935  2/1921  Janacek ................................ 114/358

FOREIGN PATENT DOCUMENTS 1978519  2/1963  Fed. Rep. of Germany ........ 114/56
515658   4/1921  France ................................ 114/56
588351   5/1925  France ................................ 114/56
1494156  7/1967  France ............................. 114/65 R
100101  10/1940  Sweden ............................. 114/355

Primary Examiner—Galen L. Barefoot
Assistant Examiner—Jesûs D. Sotelo
Attorney, Agent, or Firm—Sughrue, Mion, Zinn, Macpeak and Seas

[57] ABSTRACT

A ship hull design has circular arc frame lines of equal radius at stations 11–16 symmetrical fore and aft from a similar frame line at a central station 10, and a circular arc keel line 17 of larger radius. The submerged hull configuration is thus similar to a segment of a toroid having a circular cross-section, to minimize rolling and pitching movements in a seaway and reduce hull resistance.

8 Claims, 6 Drawing Figures

RING SEGMENT SHIP HULL

BACKGROUND OF THE INVENTION

The invention is concerned particularly with water craft intended for use on the ocean, for example merchant ships, sailing boats, motor boats or the like.

Especially in heavy seas, water craft of this type are moved in many different ways by the waves in addition to making their way through the water. These movements arise periodically as a function of the wave pattern, but also occur periodically in the form of rolling movements transverse to the longitudinal axis of the ship or boat and, because of the constant variation in the longitudinal tilt of the ship, in the form of pitching. With increasingly rough seas, when these movements are superimposed, the ship's hull, the rudder gear, the crew and the cargo are subjected to stresses.

Finally, predominantly economic considerations make it important to design the hull of a water craft in such a way that it has a high speed potential and, where a motor-driven water craft is concerned, requires as little fuel as possible. The last-mentioned criterion is very important particularly because of the constantly increasing shortage of raw materials.

SUMMARY OF THE INVENTION

The object on which the invention is based is, therefore, to provide a hull for a water craft, which has a well balanced ocean-going behavior, but nevertheless possesses as low a water resistance as possible.

When the hull designed according to the invention is considered in terms of stability, the ship or water craft being considered as suspended at the initial metacenter, this hull, in contrast to conventional hulls possessing weight stability and dimensional stability, has no dimensional stability component. In the above-mentioned way in which the ship or water craft is considered, dimensional stability arises because, starting from a vertical position of rest of the water craft, with increasing heeling the metacenter changes from an initial metacenter to an apparent metacenter. However, in the hull according to the invention, with frames in the form of arcs of a circle, there is no apparent metacenter; irrespective of the heeling of the ship, the apparent metacenter always coincides with the initial metacenter, in particular the centerpoint of the arc of the circle of the particular construction frame. Because of the lack of dimensional stability, although the hull designed according to the invention has relatively low initial stability, it nevertheless has a high final stability. A craft with a hull designed according to the invention possesses maximum stability with a heel of 90°. Consequently, with increasing heel, the stability gradually increases from the normal floating position, until it finally reaches its maximum value at a heel value which can scarsely ever be attained in practice. As regards ocean-going behavior, the conclusion to be drawn from this is, on the one hand, that rolling movements of a water craft with the hull according to the invention are damped to a high degree and, on the other hand, that capsizing is virtually impossible.

Since, according to the invention, the keel line also extends in the form of an arc of a circle, the above-mentioned conditions also apply to the longitudinal stability of the hull. Consequently, pitching of the water craft in the longitudinal direction of the ship as a result of the wave movement is also damped in the most effective way.

A further advantage of the hull according to the invention is its low water resistance. Because the keel extends arcuately, the water masses to be displaced are guided downwards and obliquely round the ship's body in a laminar flow particularly in the region of the forecastle. As a result, the hull exhibits the best possible sliding properties, insofar as the drive power of the water craft allows. In contrast to conventional ships' hulls, with a pointed bow which cuts the waves, in the hull according to the invention a scarcely noticeable bow wave is formed as a result of the uniform deflection of the displaced water masses, that is to say only a little energy is lost. The water breakaway at the stern is also more favorable in the present hull. In particular, the water can flow not only from the side, but also from below. As a result, at an appropriate ship's speed, no turbulance arises in the stern region because of an uneven flow breakaway, as can often be observed in conventional ships' hulls. Consequently, in a motor-driven water craft, the propellers work more effectively.

Because of its completely or at least mostly curved outer face, the hull has surfaces relatively insensitive to pressure. Forces exerted perpendicularly are split up into different force components because of the curves. Thus, the ship's outer skin is insensitive to buckling or similar deformations. In conjunction with the even ocean-behavior of the hull according to the invention as a result of the curved surfaces, lower stresses are exerted on the ship's fastenings than is customary in conventional ships' hulls. It is therefore possible to design the outer skin and ship's fastenings so that they are of appropriately lighter weight.

Finally, the ship's hull according to the invention can be produced more simply. The frames in the forms of arcs of a circle can be bent or cut without difficulty, and the individual plates of the outer skin can each be formed in the same way, since substantially they have the same curvature. The production costs of such a hull can consequently be reduced considerably, and this is an important feature because of constantly increasing labor costs.

In a preferred embodiment of the invention, all the construction frames have approximately the same radius. As a result of this, the center points of all the construction frames are located on a common frame center-point curve extending parallel to the keel line. Consequently, this frame center-point curve likewise extends in the form of an arc of a circle. Such a design of the hull is particularly beneficial in terms of cost, because all the construction frames not only can be produced easily, but also have the same radius. Furthermore, such a hull makes it possible to accommodate a large cargo hold in the interior and offers a large deck area. These properties are especially advantageous on merchant ships which are to have as large a carrying capacity as possible.

In an alternative embodiment of the hull according to the invention, the construction frames directed towards the bow or stern are provided with smaller radii. In this way, the hull and stern parts of such a water craft narrow in relation to the main central frames. The narrowing of the bow and stern, that is to say the reduction in the radii of the outer frames, is appropriately symmetrical, but can also be different. A ship's hull designed in this way has relatively low water line co-efficient of around 0.4, which is the ratio of the actual submerged volume to the volume of a rectangular solid formed by the waterline length, maximum width and maximum draft. Because of the sharply curved keel line of such a hull, a water craft provided with it is particularly suitable for use as an ice-breaker.

In the preferred development of the hull, the construction frames extend at most along a semi-circular path. As a result, there are no constrictions of the deck width by the frames, so that a relatively large deck area can be obtained.

Furthermore, according to the invention, the semicircular construction frames are lengthened up to the deck line by means of ship's side sections which are preferably vertical and therefore extend parallel to one another and which do not have any curvature. In this way, a jump in the run of the deck can be prevented, as a result of which it becomes possible to obtain a straight run of the deck. However, alternatively, it is also possible, by means of a further lengthening of the parallel lines adjoining the semicircular frames vertically, to obtain a negative sheer, that is to say the deck is curved upwards. In this way, an additional gain in cargo space can be achieved, particularly on freighters.

According to a further proposal of the invention, the stern and/or bow can be designed on a squared-off end, that is to say with a plane surface. As a result, sharply narrowing stern and/or bow overhangs which are relatively difficult to utilize on a merchant ship are eliminated. Moreover, this ensures simpler production in the bow and stern region which, because of its very sharp curvature is naturally more expensive to produce. In order nevertheless to obtain a favorable water breakaway at the stern or a favorable displacement characteristic in the bow region, the squared-off end regions in the stern and bow region are located outside the construction waterline.

In a further embodiment of the invention, in the submerged region, especially amidships, the bottom of the hull can be made flat or curved only in the longitudinal direction of the ship. This makes it possible to achieve an additional reduction in the draft of the ship's hull according to the invention, without the favorable ocean-going properties thereby being impaired to any notable extent. A water craft equipped with such a hull is, of course, suitable for particularly shallow waters. Because of this, such a hull comes under consideration especially for those ships which by virtue of their function are intended for negotiating shallow harbors or rivers. Such a hull is also particularly suitable for sports boats. Alternatively, a keel can be provided under the flat bottom, but also under a curved bottom, in order to increase the weight stability and lateral plan. Such a hull is especially suitable for sailing craft.

DETAILED DESCRIPTION OF THE PREFERRED EMBODIMENTS

Figure 1:
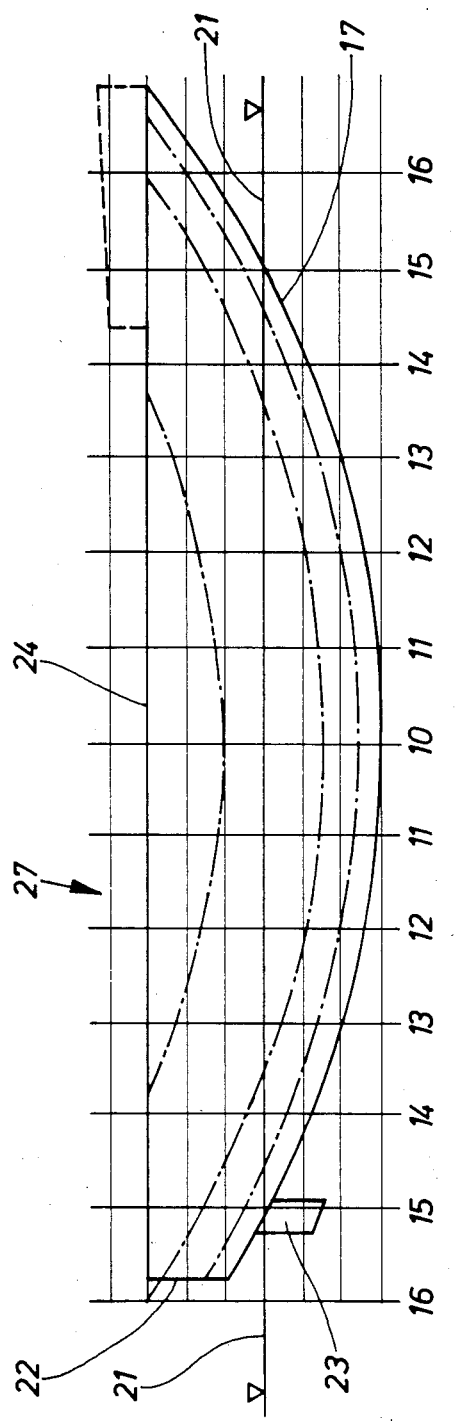
FIG. 1 shows a longitudinal sectional elevation of a hull of a water craft without a superstructure.
Figure 3:
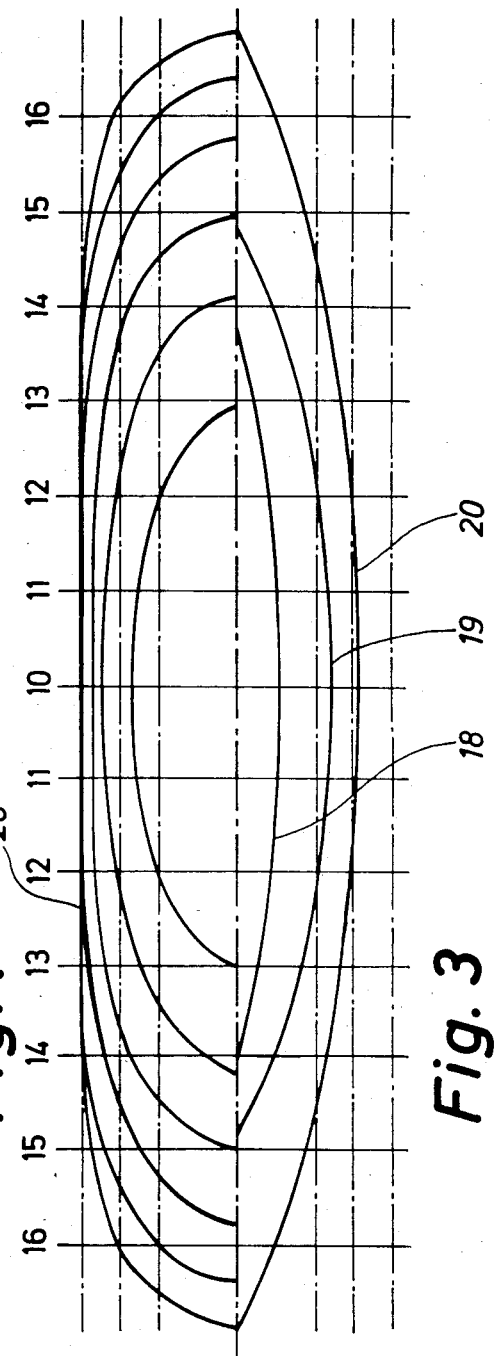
FIG. 3 shows a half-width plan of the hull according to FIGS. 1 and 2.
Figure 2:
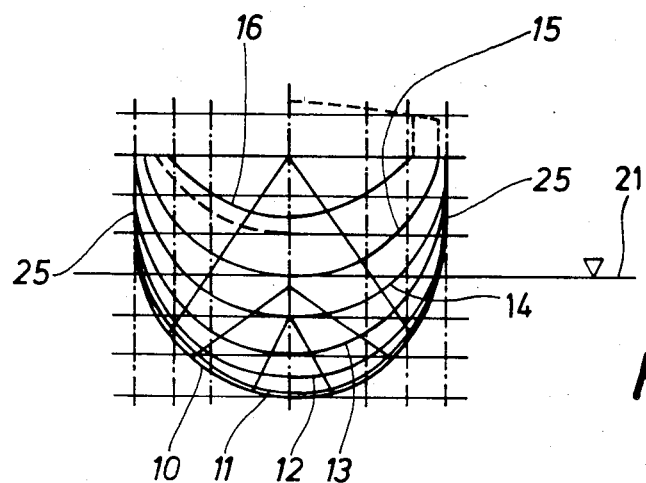
FIG. 2 shows overlaid cross sectional elevations of the hull according to FIG. 1.

FIGS. 1 to 3 show a lines plan of the hull with frame stations 10 to 16 which all have the same radius. In the embodiment illustrated, the frame lines at stations 11 to 16 located respectively at the same distance in front of and behind the middle construction station 10 are of identical design; they are mirror images. A keel line 17 is also designed in the form of an arc of a circle, but with a much larger radius in comparison with the frames at stations 10 to 16.

As the lower half of FIG. 3 shows clearly, the center lines 18 to 20 extend relatively flat because of the above-described design of the frame lines at stations 10 to 16 and the keel line 17. This path of the center lines 18 to 20 which is typical of the hull according to the invention indicates a favorable water resistance of the hull. When the radius of the keel line 17 becomes larger in relation to the radius of the frame lines, the coefficient of fineness or flatness of the center lines 18 to 20 increases even more. In the present embodiment, the ratio between the radius of the keel lines 17 and the radius of the frame lines is, for example, 6.5. The length/width ratio of the construction water line 21 has a similar value.

As shown in FIG. 1, the stern of the hull may have a squared-off end 22. Here, the latter extends vertically, as is customary for a motor ship, especially a motor-driven freighter. For yachts, preferably sailing yachts, the squared-off end 22 can also be inclined, specifically both towards the stern and towards the bow.

A freestanding rudder 23 is arrnged on the hull, in the region of the rear frame station 15, at a slight distance from the stern or squared-off end 22. The rudder 23 is preferably designed as a balanced rudder. Alternatively, however, a skeg, not shown here, can also be arranged in front of the rudder 23. In this case, the rudder 23 is unbalanced and rotatable about a front vertical axis. Moreover, the arrangement of the rudder 23 on the hull is such, here, that the vertical axis of rotation of the latter, not shown in FIG. 1, passes through the outer skin of the hull slightly above the water line 21.

Since the bottom of the hull is also curved in the submerged region, no keel is provided. Because of the curvature in the submerged region, the lateral surface obtained as a result is enough to guarantee sufficient directional stability of the water craft.

A deck line 24 extends in a straight line in the hull shown here, that is to say there is no sheer. For this purpose, construction frames extending at most along a semicircular path, specifically, here, the construction frames at stations 10 to 15, are lengthened up to the deck line 24 by vertical frame pieces 25. As FIG. 2 clearly shows, the frame lengthening pieces 25 on opposite sides of the hull extend parallel to one another. The joints of the frame lengthening pieces 25 to the construction frames at stations 10 to 15 are located above the water line 21, as a result of which the hull is completely curved in the submerged region. The middle construction at station 10 located at the lowest level has the longest frame lengthening pieces 25. In contrast to this, the outer construction frames at stations 16 in the bow and stern region have no frame lengthening pieces, since they do not describe a complete semicircle.

Because of the frame lengthening on both sides of the hull, plane-surface side regions 26 are also obtained above the water line 21 in a manner similar to the squared-off end 22. As a result of these side regions 26, the deck 27 has parallel side faces in the central region of the hull, that is to say straight deck lines 24 are obtained, as shown especially in FIGS. 3 and 6.

Figure 4:
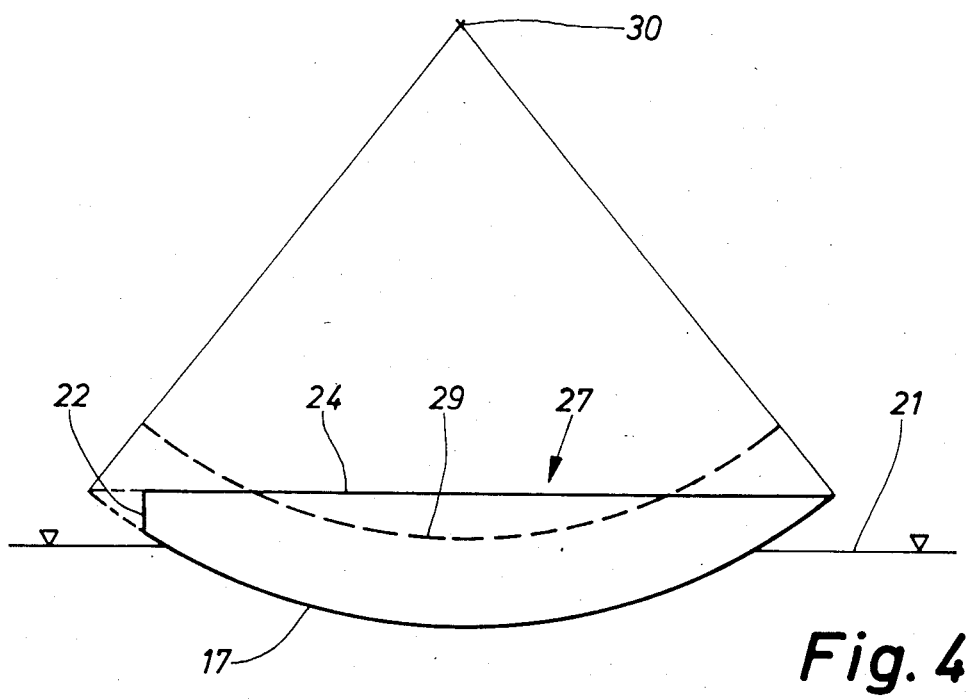
FIG. 4 shows a diagrammatic side view of the hull according to FIG. 1.
Figure 5:
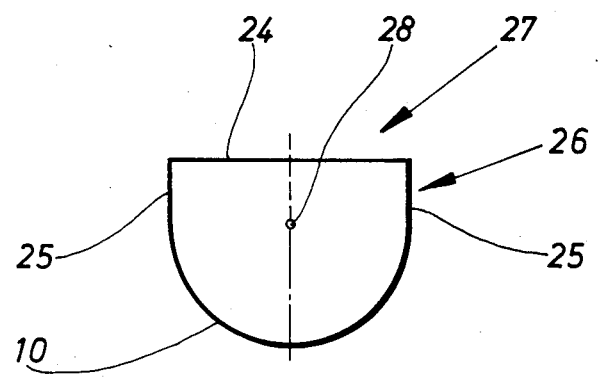
FIG. 5 shows a diagrammatic cross-section through the hull according to FIGS. 1 and 4.

The position of the central metacenter 28 is shown in FIG. 5, at the center point of the frame line arc at station 10. However, since the frame lines at stations 10 to 16 are offset relative to one another in terms of height to form a water line 21 laterally defining an arc of a circle, all of the metacenters 28 are located on a metacenter line 29 running parallel to the keel line 17 as illustrated in FIG. 4. The metacenter line 29 has a radius corresponding to the radius of the keel line 17 minus the radius of the equal frame line arcs.

Since the keel line 17 also extends in the form of an arc of a circle, the length metacenter 30 is located at the center point of the radius of the keel line 17.

Figure 6:
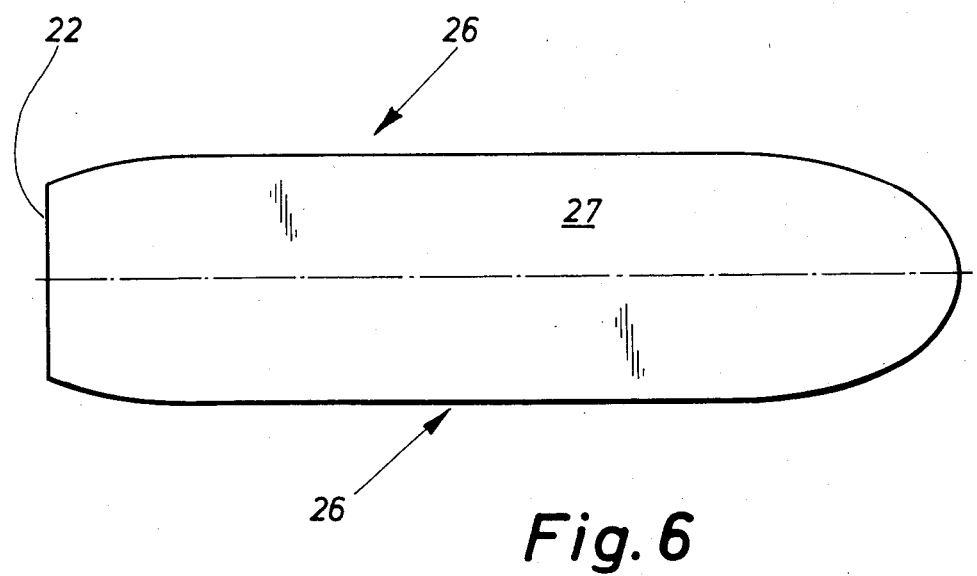
FIG. 6 shows a deck view of the hull according to the invention.

The surface of the deck 27 of the hull is seen in FIG. 6. According to this, the deck is limited laterally, in the center of the hull, by two parallel, plane side regions 26. In the bow region, an approximately eliptical foredeck surface adjoins these. In the stern region, the surface of the deck narrows arcuately towards to squared-off end 22. The latter limits the deck 27, in the aft region of the hull, by means of a straight line extending transversely to the longitudinal direction of the latter.

The above-described surface of the deck has a characteristic design for freighters with a conventional hull. By means of construction frames with different radii or by means of frame lengthening pieces 25 converging towards the deck, the hull can acquire a more convex shape, especially above the water line, with a result that the deck does not have a straight line in the central region, but a continuously arcuate run at the sides. This gives rise to deck surfaces typical of sports boats, especially sailing boats.

I claim:

1. A ship's hull configuration as defined by a longitudinal keel line, and a plurality of frame lines taken at equally spaced station planes transverse to the keel line and parallel to each other, characterized by:
   (a) the frame lines (10-16) defining circular arcs of equal radius,
   (b) the frame lines (11-16) equidistant fore and aft from a central frame line (10) being identically configured to establish fore and aft symmetry,
   (c) the keel line (17) defining a circular arc of larger radius than the frame line arcs, and
   (d) center points (28) of the frame line arcs lying on a common circular arc defining a constant metacenter line (29) regardless of heel angle, said metacenter line lying in a vertical plane including the keel line, having a common center of curvature (30) with and a smaller radius of curvature than the keel line arc and being concentrically parallel thereto, and said common center of curvature defining a constant longitudinal metacenter,
   (e) a submerged portion of the hull lying below a waterline (21) thus comprising a segment of a toroid having a circular cross-section.

2. A hull configuration as claimed in claim 1, wherein the frame line arcs traverse no more than a semicircular path.

3. A hull configuration as claimed in claim 2, wherein at least midships frame line arcs are vertically extended to a deck line (24) by frame lengthening pieces (25).

4. A hull configuration as claimed in claim 3, wherein the frame lengthening pieces (25) extend in straight lines arranged parallel and opposite to one another.

5. A hull configuration as claimed in claim 1, wherein a stern of the hull has a squared-off end (22).

6. A hull configuration as claimed in claim 5, wherein the squared-off end is disposed above water line.

7. A hull configuration as claimed in claim 1, wherein a water line coefficient is 0.4.

8. A hull configuration as claimed in claim 1, wherein a ratio between the radius of curvature of the keel line arc and the radii of curvature of the frame line arcs is approximately 6.5.

* * * * *